(12) United States Patent  (10) Patent No.: US 9,036,323 B1
White  (45) Date of Patent: May 19, 2015

(54) POWER FEEDER SHIELDING FOR ELECTROMAGNETIC PROTECTION (71) Applicant: The Boeing Company, Chicago, IL (US)

(72) Inventor: Jeffrey J. White, Shoreline, WA (US)

(73) Assignee: The Boeing Company, Chicago, IL (US)

(*) Notice: Subject to any disclaimer, the term of this patent is extended or adjusted under 35 U.S.C. 154(b) by 106 days.

(21) Appl. No.: 13/848,842

(22) Filed: Mar. 22, 2013

Related U.S. Application Data (63) Continuation-in-part of application No. 13/602,943, filed on Sep. 4, 2012.

(51) Int. Cl.
*H02H 1/04* (2006.01)
*H01B 9/02* (2006.01)
*B64D 45/02* (2006.01)

(52) U.S. Cl.
CPC . *H02H 1/04* (2013.01); *H01B 9/02* (2013.01); *B64D 45/02* (2013.01)

(58) Field of Classification Search
CPC ............. H02H 1/04; B69D 45/02; H01B 9/02
USPC ....................................................... 361/218
See application file for complete search history.

(56) References Cited

U.S. PATENT DOCUMENTS

| | | | |
|---|---|---|---|
| 2,070,141 A | 2/1937 | Robinson et al. | |
| 3,031,523 A | 4/1962 | Howard, Jr. | |
| 3,422,281 A | 1/1969 | Coston | |
| 3,459,877 A | 8/1969 | Bullock et al. | |
| 3,496,281 A | 2/1970 | McMahon | |
| 3,571,613 A | 3/1971 | Plate et al. | |
| 3,673,307 A | 6/1972 | Eager et al. | |
| 4,715,571 A | 12/1987 | Soltow et al. | |
| 4,816,611 A | 3/1989 | Invernizzi | |
| 5,131,064 A | 7/1992 | Arroyo et al. | |
| 5,218,167 A | 6/1993 | Gasque, Jr. | |
| 5,243,138 A | 9/1993 | Guthke et al. | |
| 5,418,330 A | 5/1995 | Rook | |
| 5,631,444 A | 5/1997 | Rook | |
| 5,742,982 A | 4/1998 | Dodd et al. | |
| 5,817,982 A | 10/1998 | Arumugasaamy et al. | |
| 5,834,699 A | 11/1998 | Buck et al. | |
| 5,864,094 A | 1/1999 | Griffin | |
| 6,127,625 A | 10/2000 | Castano | |
| 6,191,354 B1 | 2/2001 | Castano et al. | |
| 7,060,905 B1 | 6/2006 | McMahon | |
| D597,403 S | 8/2009 | Ho et al. | |
| 8,020,259 B2 | 9/2011 | Ho et al. | |
| 8,020,811 B2 | 9/2011 | Nelson | |

(Continued)

OTHER PUBLICATIONS

U.S. Appl. No. 13/602,943, Office Action issued Dec. 4, 2014.

(Continued)

*Primary Examiner* — Scott Bauer
(74) *Attorney, Agent, or Firm* — Thompson Hine LLP (57) ABSTRACT

A system for lightning protection for power feeders may include at least one unshielded power feeder conductor; and a grounded wire extending adjacent the at least one unshielded power feeder conductor and being electrically isolated therefrom, whereby lightning current flowing through the grounded wire establishes a magnetic field sufficient to oppose and reduce lightning-induced current on the at least one power feeder conductor.

20 Claims, 11 Drawing Sheets

(56) References Cited

U.S. PATENT DOCUMENTS

| | | |
|---|---|---|
| 8,590,847 B2 | 11/2013 | Guthke et al. |
| 8,873,214 B2 | 10/2014 | Catchpole et al. |
| 2001/0011601 A1 | 8/2001 | Renaud |
| 2004/0200634 A1 | 10/2004 | Ysbrand |
| 2005/0057320 A1 | 3/2005 | Brandt et al. |
| 2006/0158035 A1 | 7/2006 | Brandt et al. |
| 2007/0120023 A1 | 5/2007 | Martinez et al. |
| 2007/0272430 A1 | 11/2007 | Tuffile et al. |
| 2008/0007878 A1 | 1/2008 | Gandolfi et al. |
| 2009/0261651 A1 | 10/2009 | Godecke et al. |
| 2010/0046128 A1 * | 2/2010 | Wang et al. .................... 361/42 |
| 2010/0097023 A1 * | 4/2010 | Nakamura et al. ....... 318/400.41 |
| 2010/0307811 A1 | 12/2010 | Griffin |
| 2012/0000690 A1 | 1/2012 | Van Der Meer |
| 2012/0043108 A1 | 2/2012 | Blumer et al. |
| 2012/0075756 A1 | 3/2012 | Yu et al. |
| 2013/0187012 A1 | 7/2013 | Blakeley et al. |
| 2013/0258541 A1 | 10/2013 | Knobloch et al. |

OTHER PUBLICATIONS

U.S. Appl. No. 14/136,918, Office Action issued Dec. 9, 2014.

* cited by examiner

POWER FEEDER SHIELDING FOR ELECTROMAGNETIC PROTECTION

BACKGROUND

The present invention relates to electrical conductors and, more particularly, to electrical conductors for transmitting electrical power that are shielded from electromagnetic effects.

Electrical systems aboard aircraft are susceptible to electromagnetic effects (EME). As used herein, EME includes electromagnetic interference (EMI), such as transient voltage and current spikes caused by lightning, as well as electromagnetic compatibility (EMC) issues. Such electrical systems often include long runs of conductors that convey electric current from a source, such as a battery, generator or circuit panel, to a load, such as a motor, a light or other electrical component. For example, a lightning strike may cause electric voltage or current to be induced in the conductors, where it travels to and may damage electrical components.

The effect of a lightning strike may be mitigated somewhat in an aircraft made of a conductive material such as aluminum. A lightning strike may be conducted along the skin of an aircraft made of aluminum and not induce significant electric current in the conductors of on-board electrical systems. However, with the introduction of aircraft made partly or entirely of composite materials, such as carbon fiber composites, the ability of the skin of an aircraft to conduct electricity and therefore act as a shield for internal electrical conductors from external EMI such as lightning strikes, is reduced or eliminated, which may require greater shielding of electrical conductors.

Typically, an electrical conductor, such as that found in a power feeder system, may provide three-phase power. The three-phase power may be created by a generator on board the aircraft and transmitted by cables to a bus or load, such as a three-phase motor. The feeder system in such an application may include three discrete, insulated cables wrapped around a neutral cable, forming a bundle. The bundle of four cables may be enclosed in a sheath of braided metallic material (commonly referred to as a shield) that is grounded at its ends. The braided metallic material may be covered by a sheath of insulating material, and may be separated from the bundle of conductors and neutral cable by a layer of insulated material.

The metallic sheath that covers the entire bundle of conductors and the neutral cable may add to the non-payload weight of the aircraft, which is undesirable. Moreover, by enveloping the entire cable bundle in a grounded, metallic sheath, which in turn may be covered by an insulative sheath, there is a risk of unacceptable heat build-up within the sheath. Accordingly, there is a need for a power feeder system that provides adequate protection from transient voltage spikes resulting from EME, such as lightning strikes to an aircraft, and which minimizes heat build-up and weight.

SUMMARY

In one embodiment, a system for lightning protection for power feeders may include at least one unshielded power feeder conductor; and a grounded wire extending adjacent the at least one unshielded power feeder conductor and being electrically isolated therefrom, whereby lightning current flowing through the grounded wire establishes a magnetic field sufficient to oppose and reduce lightning-induced current on the at least one power feeder conductor.

In another embodiment, a system for lightning protection for power feeders may include a plurality of unshielded power feeder conductors; and a grounded wire extending adjacent the plurality of unshielded power feeder conductors and being electrically isolated therefrom, the grounded wire and the plurality of unshielded power feeder conductors together forming a bundle, the grounded wire being positioned at a center of the bundle, whereby lightning current flowing through the grounded wire establishes a magnetic field sufficient to oppose and reduce lightning-induced current on the plurality of power feeder conductors.

In yet another embodiment, a method of forming a system for lightning protection for power feeders may include providing at least one unshielded power feeder conductor; providing a ground wire extending adjacent the at least one unshielded power feeder conductor and being electrically isolated therefrom; and grounding the ground wire to form a grounded wire, whereby lightning current flowing through the grounded wire establishes a magnetic field sufficient to oppose and reduce lightning-induced current on the at least one power feeder conductor.

Other aspects and advantages of the present disclosure will be apparent from the following description, the accompanying drawings and the appended claims.

DETAILED DESCRIPTION

Figure 1:
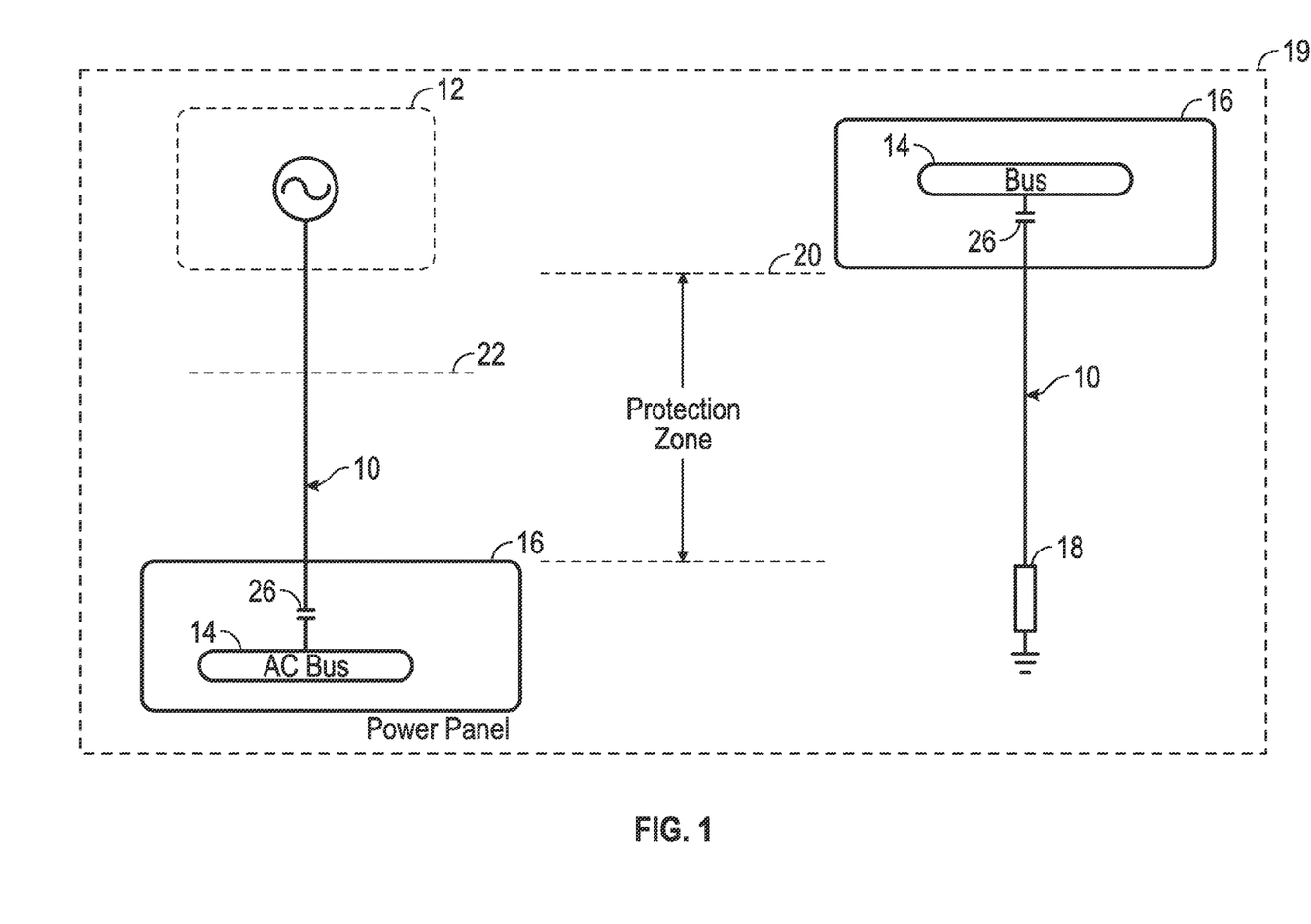
FIG. 1 is a schematic showing the disclosed shielded power feeder system used to convey power from a generator to a power panel, and from a power panel to a load.

As shown in FIG. 1, the shielded power feeder system, generally designated 10, may be employed to extend between a generator 12 and an electrical bus 14, which may consist of one or more electrical components or loads, as shown in the left-hand portion of FIG. 1. In an embodiment, the shielded power feeder system 10 also may be employed to extend between a power panel 16 and a load 18, as shown in the right-hand portion of FIG. 1. In an embodiment, the electrical bus 14 may be the source, while the load 18 may be a variable frequency starter generator (such as the generator 12). In other embodiments, the load 14 may be a single-phase or polyphase motor, or other electrical component. Either or both of the circuits shown in FIG. 1 may be located within a vehicle 19, such as an aircraft. The shielded power feeder system 10 may extend through a protection zone 20 that may include a production break 22 (e.g., where an aircraft wing is attached to a fuselage). The power feeder system 10 may be connected to the bus 14 of power panel 16. The power panel 16 also may include a circuit breaker 26.

Figure 2:
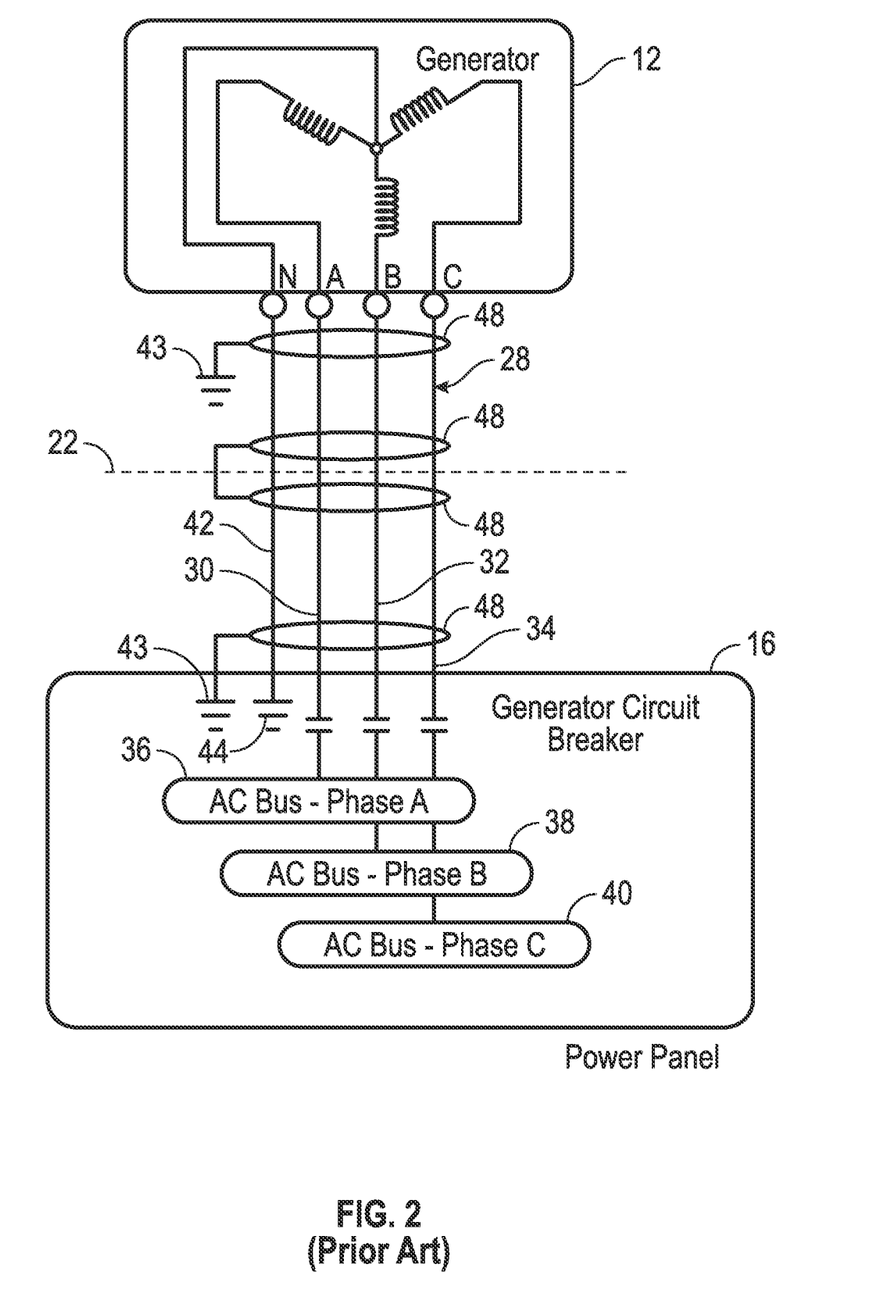
FIG. 2 is a schematic showing a prior art shielded power feeder system.
Figure 4A:
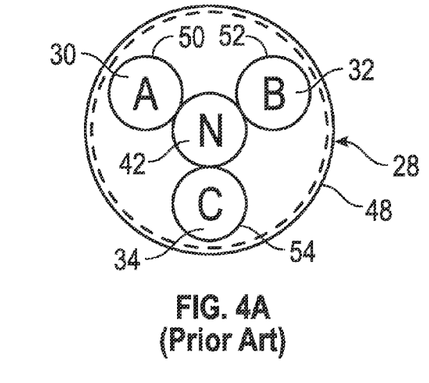
FIGS. 4A and 4B are schematics showing cross-sections of prior art power feeder cables.

As shown in FIG. 2, in a prior art shielded power feeder system, generally designated 28, the system may include power feeder conductors 30, 32, and 34. Conductors 30, 32, 34 are connected, respectively, to alternating current buses 36, 38, 40 within a power panel 12. Cables 30, 32, 34 may be connected to contacts A, B and C of a three-phase generator 12. Neutral conductor 42 may be connected to the neutral contact N and grounded at 44. As shown in FIG. 4A, the conductors 30, 32, 34 may be spaced about the neutral 42. The conductors 30, 32, 34, and neutral 42 together form a bundle that is shielded by a sheath 48 that encloses the entire bundle; that is, the sheath 48 encloses conductors 30, 32, 34, and neutral 42. Further, conductors 30, 32, 34 themselves may have insulative coverings or sheaths 50, 52, 54. The sheath 48 may include a first layer of an insulative material such as plastic or rubber, a second layer of a conductive material, grounded at its ends 43, such as a woven sheath of metal such as copper or nickel-plated copper, and an outer layer of an insulative material, such as a plastic or rubber.

Figure 4B:
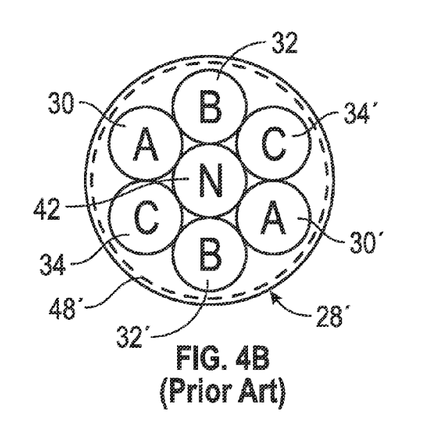

As shown in FIG. 4B, in another prior art power feeder system 28', a neutral cable 42 is surrounded by 6 conductors 30, 30', 32, 32', 34, 34'. As with the embodiment of FIG. 4A, the embodiment of FIG. 4B provides a neutral cable 42 that is surrounded by conductors 30-34', typically wrapped around the neutral in a spiral pattern. The entire arrangement forms a bundle that is enclosed within a sheath 48' having the same layered construction as the sheath 48 of FIG. 4A; namely, an inner layer of insulated material, a layer of conductive material surrounding it, and an outer layer of insulated material.

A disadvantage with this construction is that the shielded power feeder system 28, 28' requires a great deal of metal to form the sheath 48, 48', which adds non-payload weight to the aircraft 18 (FIG. 1). Further, by enclosing the entire bundle in sheath 48, 48', the enclosure may allow undesirable heat build-up in the power feeder system within the sheath 48, 48'.

Figure 3:
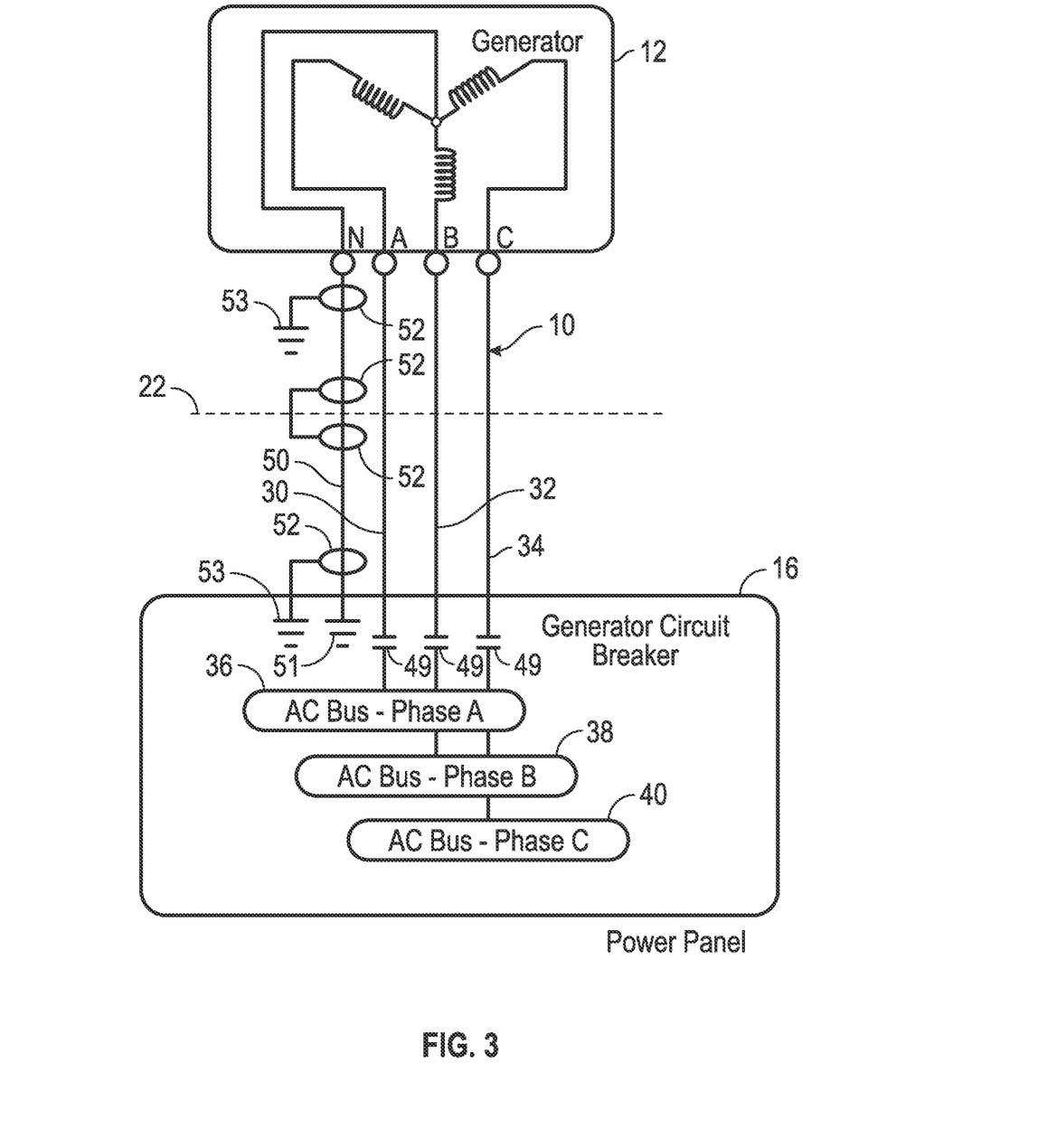
FIG. 3 is a schematic showing an embodiment of the disclosed shielded power feeder system.
Figure 6A:
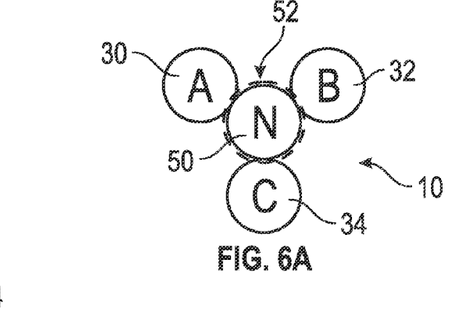
FIGS. 6A and 6B are cross-sections of embodiments of the disclosed shielded power feeder system.

As shown in FIGS. 3 and 6A, the disclosed shielded power feeder system 10 may be used in a three-phase power feeder system. In other embodiments, the power feeder system may be used in other polyphase systems (not shown) having two phases, or more than three phases, or may be used in a single-phase system (not shown). In the system 10 shown in FIG. 3, power feeder conductors 30, 32, 34 may be connected to alternating current buses 36, 38, 40 of the power panel 16, and extend to contacts A, B, and C (corresponding to the three phases of the generator) of the load, which may be a generator 12, such as a variable frequency starter generator. The conductors 30, 32, 34 each may be connected to a circuit breaker 49 of the power panel 16.

In an embodiment, the power feeder conductors 30, 32, 34 may be cables and may be unshielded; that is, they do not include coverings that include a conductive layer or shield from EME. As used herein, the term "unshielded" means, with respect to a conductor, that the conductor is not covered with a conductive layer separated by an insulating layer. An unshielded conductor may be covered by a layer or layers of insulating material and still be unshielded if it does not also have a layer of conductive material covering it.

Figure 5:
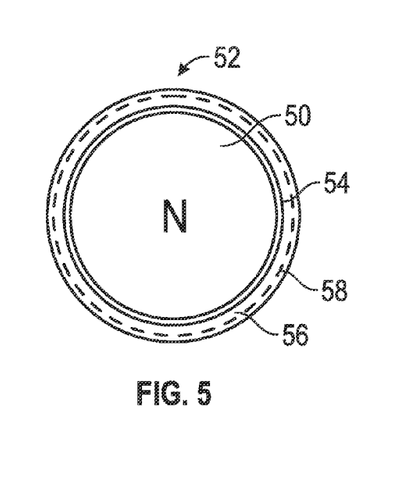
FIG. 5 is a cross-section of a neutral conductor of the disclosed shielded power feeder system.

The system 10 also may include a neutral conductor 50 that is connected to the power panel 16 and contact N of the generator 12, and is grounded at 51. As shown in FIGS. 3 and 5, the neutral conductor 50 is enclosed in a conductive shield, generally designated 52, that is grounded at its ends at 53. In other embodiments, the conductive shield 52 may be grounded at one or more additional locations between its ends. In an embodiment, the conductive shield 52 may be layered directly on the outer surface of the neutral conductor 50. In various embodiments, the conductive shield 52 may extend the entire length of the neutral conductor 50, may extend along only length in the protection zone 20 (FIG. 1), or a portion or portions of the neutral conductor.

As shown in FIG. 5, the conductive shield 52 that encloses neutral conductor 50 may include an insulation layer 54 that is immediately adjacent the neutral conductor 50, and in an embodiment is bonded directly to the neutral conductor. The insulation layer 54 may be composed of plastic or rubber. A conductive layer 56 is immediately adjacent and encloses the insulation layer 54. Conductive layer 56 may be made of a metallic material and may be braided. Metallic materials may include copper and nickel-plated copper. In other embodiments, the conductive layer 56 may be made of a conductive foil or a combination of braided metallic material and conductive foil material. In an embodiment, the conductive shield 52 may include an outer layer or jacket 58 of an insulative material, such as plastic or rubber covering the conductive layer 56.

As shown in FIG. 6A, the power feeder conductors 30, 32, 34 and neutral conductor 50 of the power feeder system 10 may be arranged in a bundle in which the neutral conductor may be positioned at the center of the bundle, surrounded by the unshielded power feeder conductors. As is apparent from FIG. 6A, the only shielding from EME present in the bundle may be the grounded conductive shield 52 that encloses the neutral conductor 50. In an embodiment, the conductors 30, 32, 34 may be spaced evenly about the neutral conductor 50 and, in an embodiment, the conductors 30, 32, 34 extend in a spiral configuration (commonly referred to as twisted) as they extend lengthwise between the power panel 16 and load 14 or generator 12 (FIG. 1).

Figure 6B:
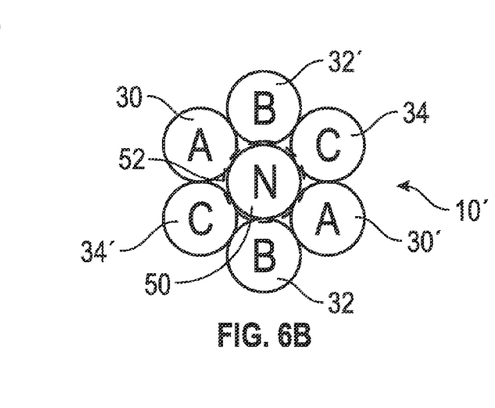

As shown in FIG. 6B, a power feeder system 10' may include a bundle composed of six unshielded power feeder conductors 30, 32, 34, 30', 32', 34', spaced evenly about the shielded neutral conductor 50. Again, the shielding 52 may be the only shielding that is required or present in the bundle of feeder system 10'.

Figure 7A:
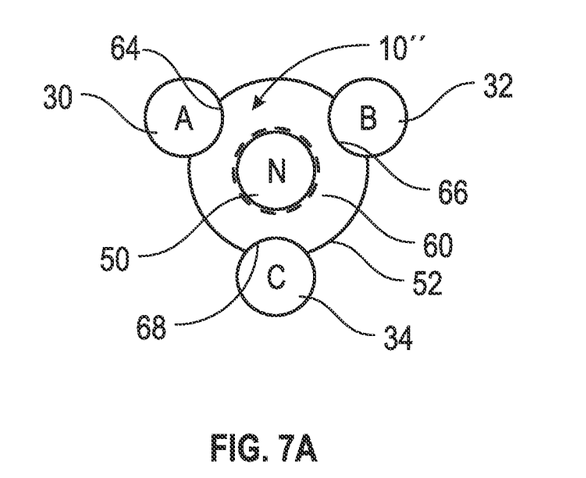
FIGS. 7A and 7B are embodiments of the disclosed shielded power feeder system, shown with spacers between the conductor cables and the neutral cable.
Figure 7B:
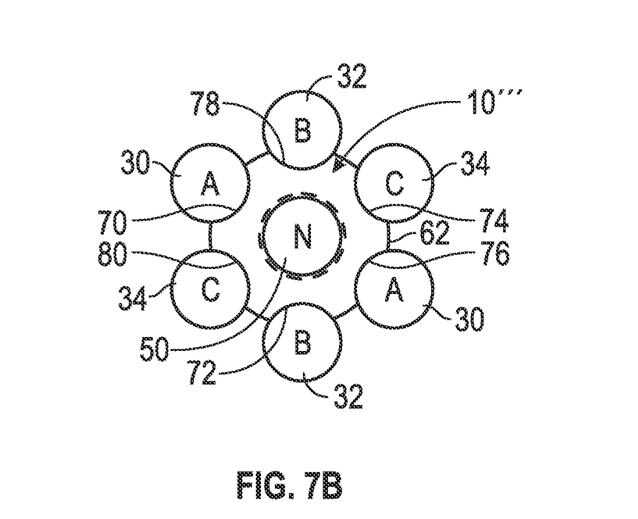

As shown in FIGS. 7A and 7B, embodiments 10" and 10'" of the disclosed shielded power feeder system may include spacers 60, 62. The spacer 60 of FIG. 7A may surround neutral conductor 50 and grounded conductive shield 52. The spacer 60 may include recesses 64, 66, 68 shaped to receive unshielded conductors 30, 32, 34.

Similarly, in FIG. 7B, spacer 62 may include recesses 70, 72, 74, 76, 78, 80 shaped to receive unshielded conductors 30, 32, 34, 30', 32', 34', respectively. Spacers 60, 62 may maintain the unshielded conductors 30, 32, 34, 30', 32', 34' in an evenly spaced relationship as shown in FIGS. 7A and 7B. As indicated in FIG. 1, a plurality of spacers 60, 62 may be spaced along the power feeder system 10 in the protection zone 20.

Spacers 60, 62 may be oriented relative to each other to maintain a helical path of the conductors 30, 32, 34, 30', 32', 34' around neutral cable 50 as they extend from the power panel 16 to the load 14 or generator 12.

As best understood, in the event of EME, such as a lightning strike or other electromagnetic pulse, impacting the vehicle 18 (FIG. 1), the current from the EMI would be carried by the conductive layer 56 (FIG. 5) of the neutral conductor 50 to ground 44. The flow of current from the EMI source through the conductive layer 56 may establish a magnetic field in the center of the bundle shown in FIGS. 6A, 6B, 7A, and 7B, which in turn opposes and cancels EMI-induced currents on the feeder conductors 30, 32, 34, 30', 32', 34'. An advantage of the embodiments 10, 10' 10", and 10''', is that the design provides protection of power feeders and other conductors aboard a vehicle such as an aircraft 18 from damage from lightning-induced voltage and current, as well as other EME, by employing a small shield 52 that surrounds only the neutral conductor 42. The neutral shield 52 conducts the lightning current or other EME current safely to ground, and establishes a magnetic field in the center of the bundle that opposes any induced voltage or currents on the other feeder conductors. Because the shield 52 surrounds only the neutral conductor 50, as opposed to surrounding the entire bundle of conductors, as shown in the prior art depicted in FIGS. 2, 4A and 4B, the system 10, 10', 10" and 10''' design may provide a significant reduction in the overall weight of the power feeder system.

Figure 8:
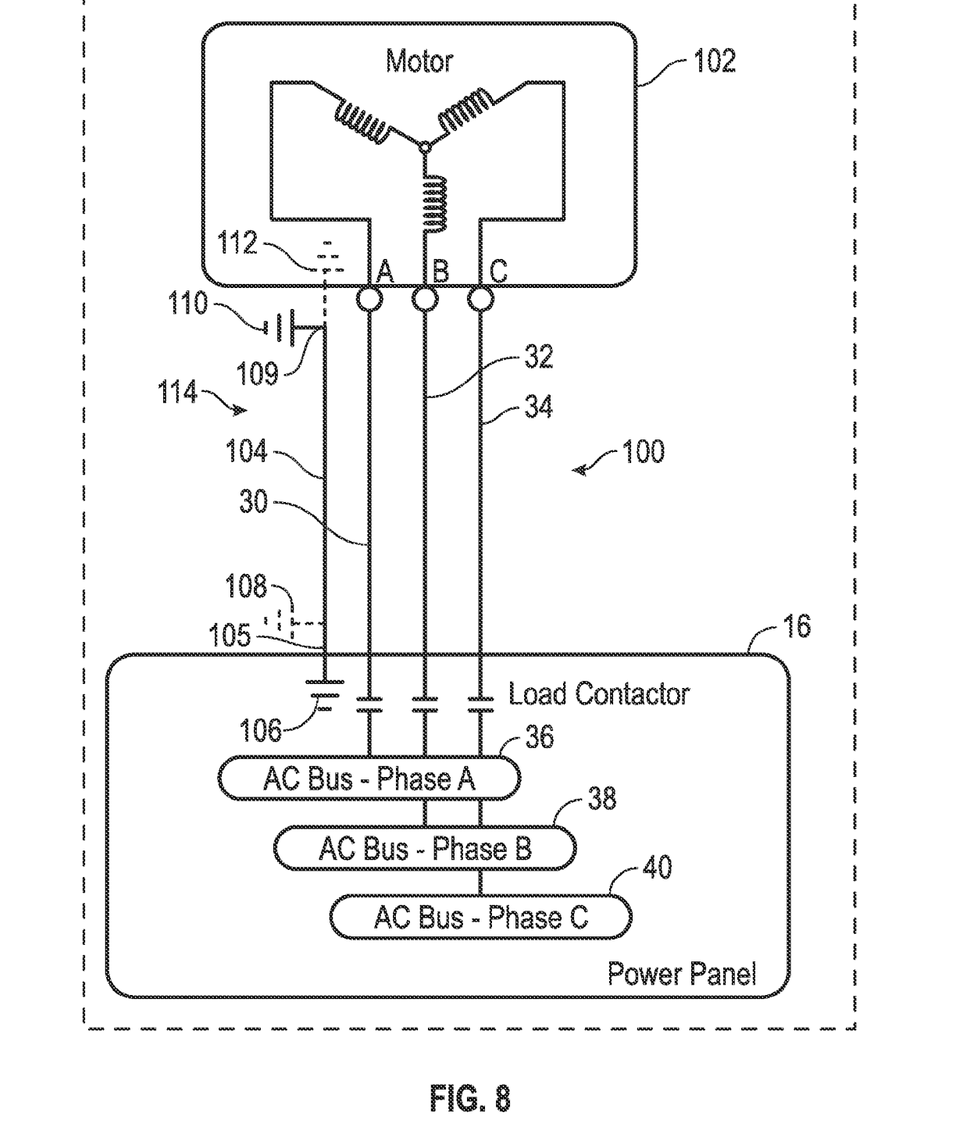
FIG. 8 is a schematic showing an embodiment of the shielded power feeder system, used with a three-phase motor.

As shown in FIG. 8, an embodiment of the shielded power feeder system, generally designated 100, may be used in connection with unshielded power feeder conductors 30, 32, 34 that extend between alternating current buses 36, 38, 40, respectively, of a power panel 16 and a three-phase motor 102. The system 100 may include a grounded wire 104 that extends adjacent the unshielded power feeder conductors 30, 32, 34 and is electrically isolated from them. In an embodiment, the unshielded power feeder conductors 30, 32, 34 may be covered with an outer insulation layer that electrically isolates the power feeder conductors from the grounded wire 104. Alternately, or in addition, the grounded wire 104 may be covered with an eat outer insulation layer that electrically isolates the grounded wire from the power feeder conductors 30, 32, 34.

A first end 105 of the grounded wire 104 may be attached and grounded at 106 to the power panel 16. Alternately, the first end 105 of the grounded wire 104 may be grounded at 108 to a current return network, or to a metal structure such as the mounting structure of the power panel 16 of the aircraft 19. Similarly, a second end 109 of the grounded wire 104 may be connected at 110 to a current return network, or to a metal structure, such as a strut, of the aircraft 19. Alternately, the second end 109 of the grounded wire 104 may be connected at 112 and grounded to the housing of the three-phase motor 102. With each of the embodiments, the grounded wire extends through a lightning threat zone, generally designated 114, of the aircraft 19. It may be preferable to ground the grounded wire 104 as close to the ends of the unshielded power feeder conductors 30, 32, 34 as practicable.

Figure 9:
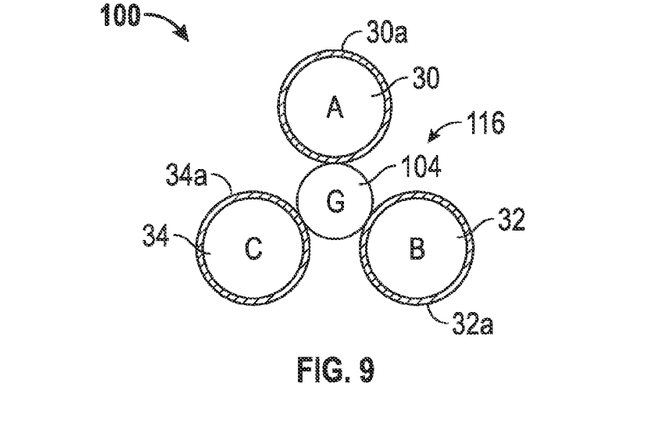
FIG. 9 is a schematic detail of the shielded power feeder system of FIG. 8.

As shown in FIG. 9, the power feeder conductors 30, 32, 34 and grounded wire 104 may be arranged in a bundle, generally designated 116. With the bundle 116, the grounded wire 104 may be positioned at a center of the bundle and the conductors 30, 32, 34 arranged and evenly spaced around the grounded conductor. The conductors 30, 32, 34 may include insulation layers 30a, 32a and 34a, respectively. In the event of a lightning strike to the aircraft 19 (FIG. 8), lightning current may flow through the grounded wire 104 along at least the lightning threat zone 114. This flow of lightning current may establish a magnetic field around the bundle 116 that may be sufficient to cancel, or at least oppose and reduce, lightning-induced current in the unshielded power feeder conductors 30, 32, 34, thereby protecting the power feeder conductors and preventing or reducing both spikes along the power feeder conductors.

Figure 10A:
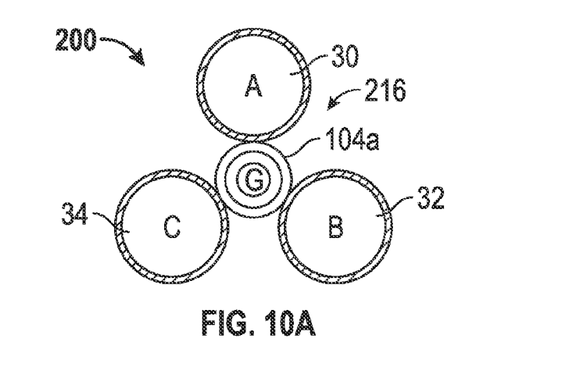
FIGS. 10A and 10B are embodiments of the shielded power feeder system of FIG. 8, in which the grounded wire is layered.
Figure 10B:
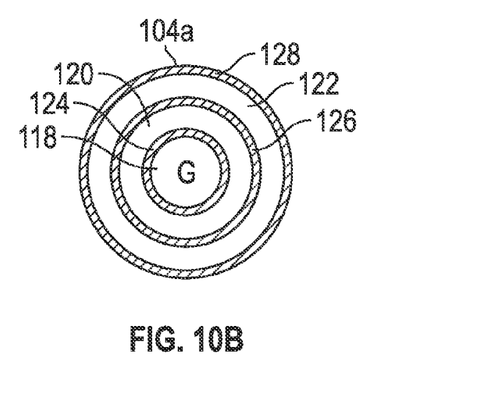

As shown in FIGS. 10A and 10B, in another embodiment 200 of the shielded power feeder system, a grounded wire 104a may be utilized in place of grounded wire 104 of the embodiment 100 in FIG. 9. Grounded wire 104a, shown best in FIG. 10B, may include a center grounded wire 118 enclosed by layers 120 and 122 of grounded wires. The grounded wires 118, 120 122 may be separated by layers 124, 126 of insulation. In an embodiment, the conductor wire 104a also may include a layer 128 of insulation about its outer surface.

An advantage of the grounded wire 104a over the grounded wire 104 of FIG. 8 is that the surface area or outer "skin" of the grounded wire 104a is much greater for a given diameter and length of grounded wire. This may be important because a lightning strike may be at frequencies between 10 kHz and 1 MHz. At such frequencies, the current flows through the skin of a conductor, such as the grounded wire 104a. Accordingly, by increasing the surface area of the skin of the grounded wire 104a for a given diameter, a smaller diameter grounded wire may be employed and carry a relatively high current in the event of a lightning strike, when compared to the grounded wire 104 of FIG. 9, for example.

Figure 11A:
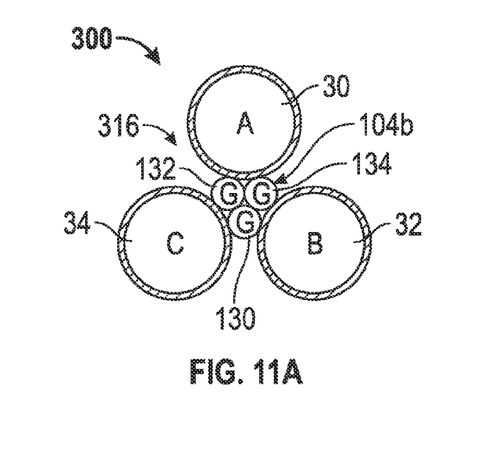
FIGS. 11A and 11B are embodiments of the shielded power feeder system of FIG. 8, utilizing more than one grounded wire.
Figure 11B:
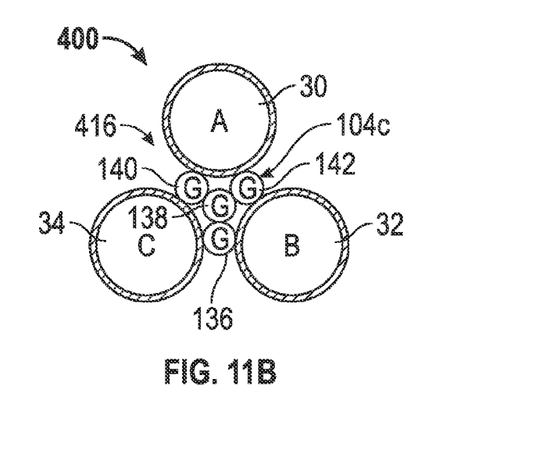

As shown in FIGS. 11A and 11B, embodiments 300, 400 of the shielded power feeder system may include grounded wires 104b and 104c in the form of multiple grounded wires of a relatively smaller diameter, compared to grounded wire 104 of FIG. 9, for example, forming bundles 316 and 416, respectively, with unshielded power feeder conductors 30, 32, 34. In FIG. 11A, grounded wire 104b may be in the form of grounded wires 130, 132, 134. Grounded wires 130, 132, 134 may be located in the center of the bundle 316. Similarly, as shown in FIG. 11B, grounded wire 104c may be in the form of grounded wires 136, 138, 140, 142. Grounded wires 136, 138, 140, 142 may arranged symmetrically in a center of a bundle 416, in which grounded wires 136, 140, 142 may be spaced evenly about a centrally positioned grounded wire 138. Again, the use of multiple grounded wires in the embodiments 11A and 11B may increase the surface area of the grounded wires 104b, 104c, which may allow more current to flow along the skin of the grounded wires at the high frequencies of a lightning strike for a given diameter of grounded wires.

Figure 12A:
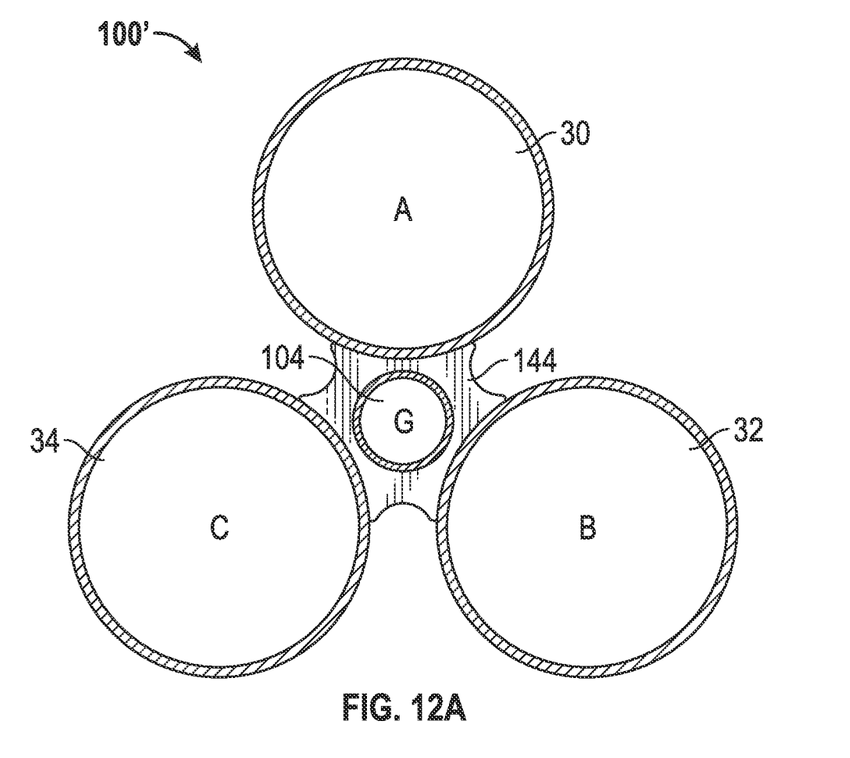
FIGS. 12A, 12B and 12C are embodiments of the shielded power feeder system of FIG. 8, in which the grounded wires are connected to the conductors by spacers.
Figure 12B:
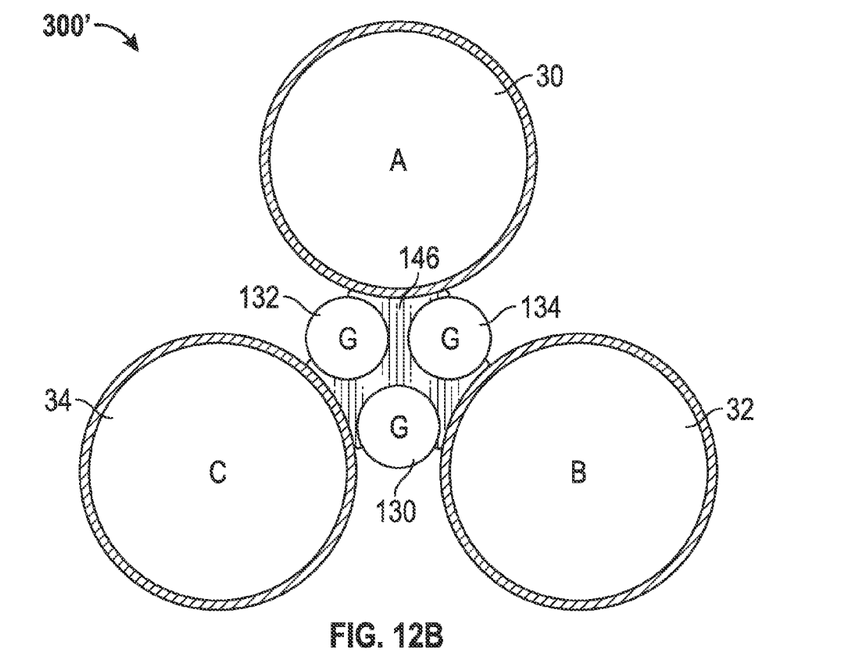
Figure 12C:
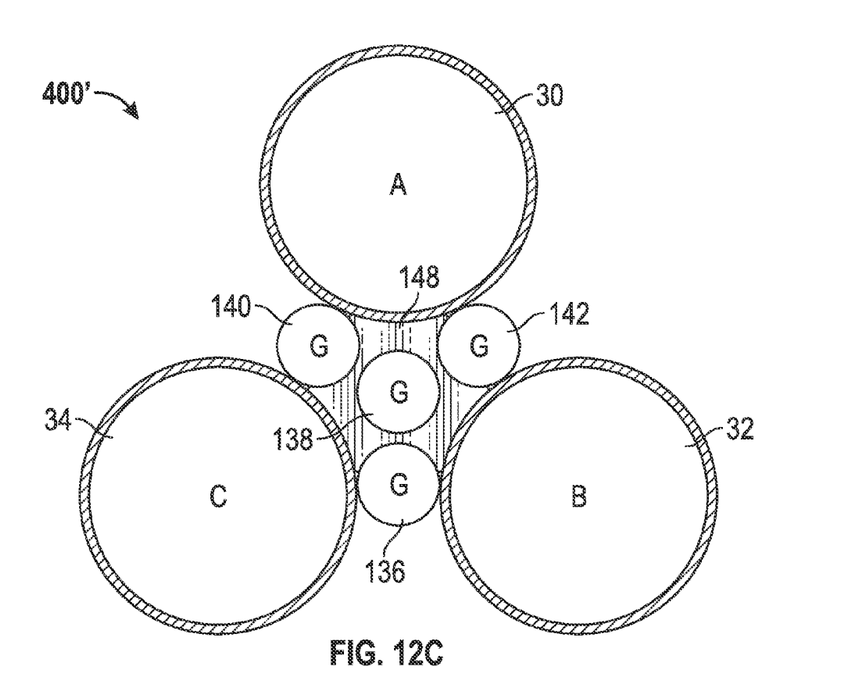

The embodiments 100', 300' and 400' of the shielded power feeder system are shown in FIGS. 12A, 12B, and 12C, respectively, and represent modifications of the embodiments 100, 300, and 400 of FIGS. 9, 11A and 11B, respectively. The embodiments 100', 300', 400' may include spacers 144, 146, 148, respectively. In each embodiment 100', 300' and 400', the spacers 144, 146, 148 may be configured to engage and hold in place the grounded wires 104, 130, 132, 134, 136, 138, 140, 142 relative to the unshielded power feeder conductors 30, 32, 34. In embodiments, the spacers 144, 146, 148 maintain the orientation of the conductors 30, 32, 34 so that they may be spaced evenly about the conductor 104 (FIG. 12A), the conductors 130, 132, 134 (FIG. 12B) and grounded wires 136, 138, 140, 142 (FIG. 12C). Further, the spacers 146, 148 may maintain the spacing and orientation of their respective grounded wires.

Figure 13A:
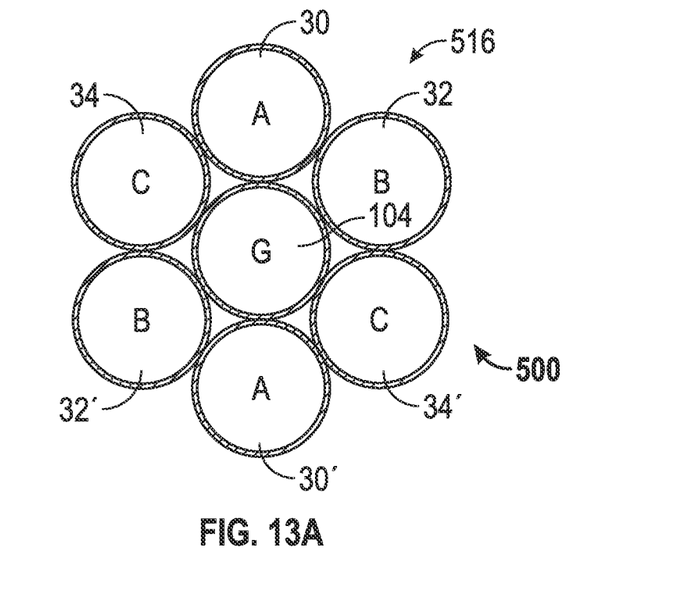
FIGS. 13A and 13B are embodiments of the disclosed shielded power feeder system of FIG. 8, in which the conductors are in the form of parallel feeders.
Figure 13B:
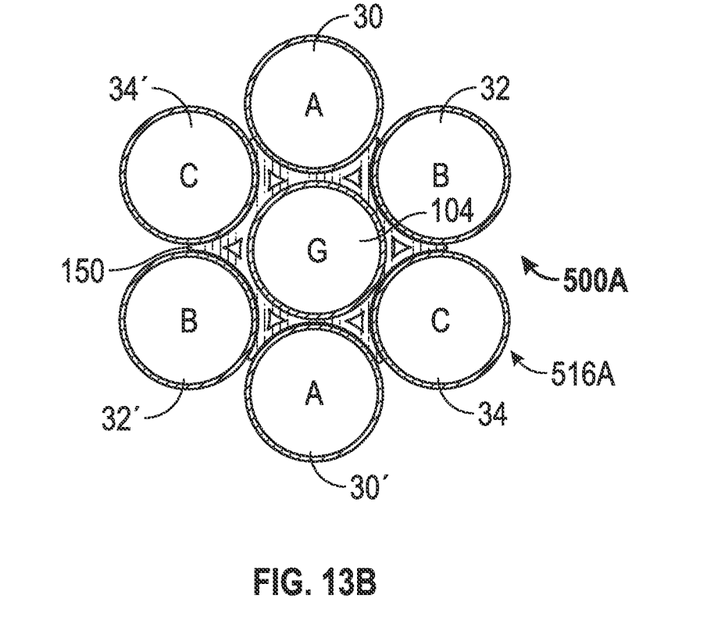

As shown in FIGS. 13A and 13B, in embodiments 500, 500A of the shielded power feeder system, a grounded wire 104 may be positioned in the center of bundles 516, 516A, respectively, of parallel, unshielded power feeder conductors 30, 32, 34, 30', 32', 34'. In the embodiments 500, 500A, the conductors 30, 32, 34, 30', 32', 34' may be spaced evenly about the grounded wire 104, which in an embodiment is located at a center of the bundles 516, 516A. In the embodiment of FIG. 13B, the bundle 500A may include a spacer 150 that engages and holds in place the grounded wire 104 and the unshielded power feeder conductors 30, 32, 34, 30', 32', 34'.

Figure 14:
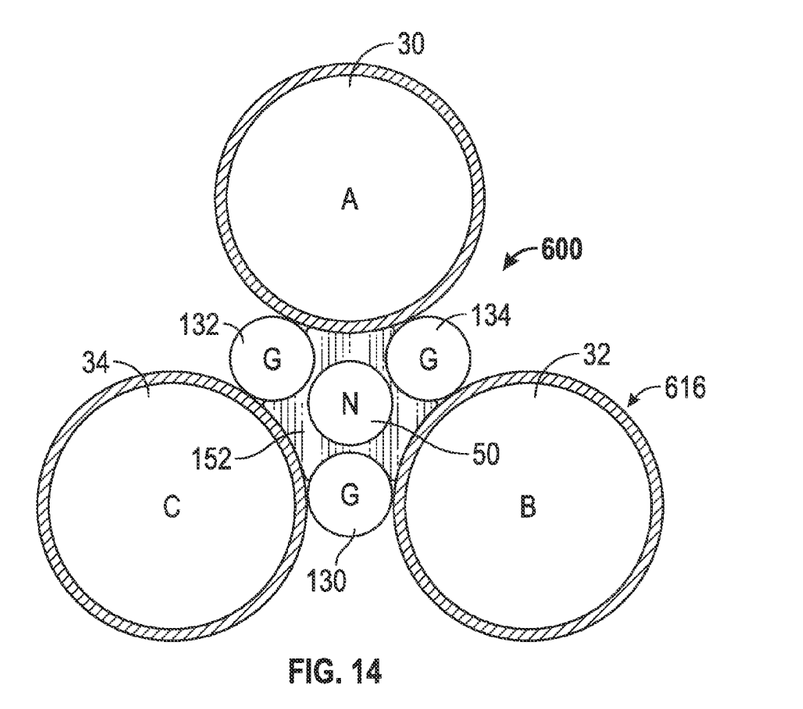
FIG. 14 is an embodiment of the shielded power feeder system of FIG. 8, in which a neutral is included.

As shown in FIG. 14, an embodiment 600 of the shielded power feeder system may include a bundle 616 in which conductors 30, 32, 34 may be arranged about a center containing a neutral wire 50. The neutral wire 50 may be part of a generator 12 connected to a power panel 16 (see FIGS. 2 and 3). The grounded wires 130, 132, 134 may be positioned between the unshielded power feeder conductors 30, 32, 34, and adjacent the neutral wire 50. The orientation of the wires in the bundle 616 may be maintained by a spacer 152, which engages and holds the wires in place. The even spacing of the grounded wires 130, 132, 134 about the neutral wire 50, and relative to the unshielded power feeder conductors may optimize the current canceling effect in the neutral wire and conductors by the grounded wires in the event of a lightning strike.

Figure 15:
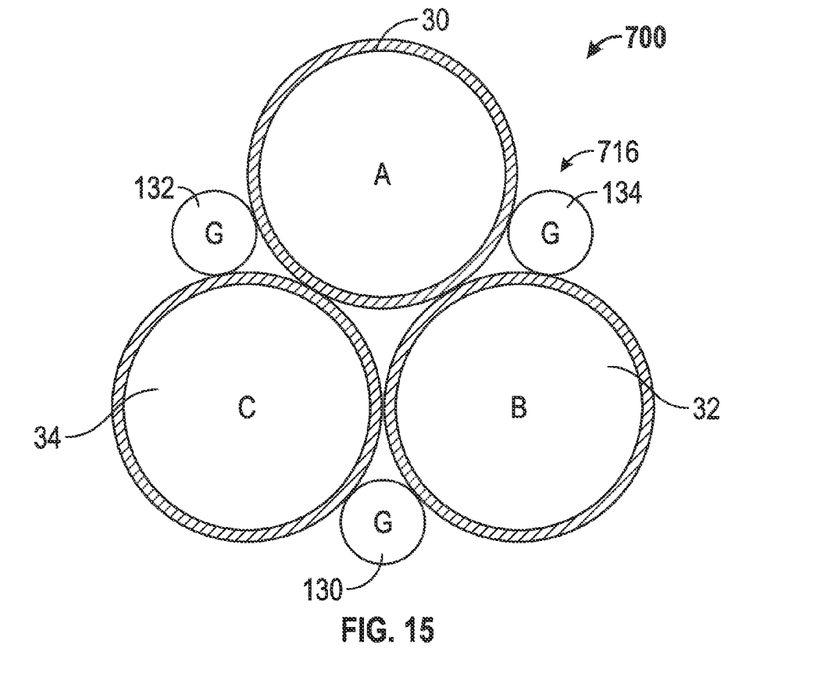
FIG. 15 is an embodiment of the shielded power feeder system of FIG. 8, wherein multiple grounded wires are positioned away from the center of the bundle.

As shown in FIG. 15, in an embodiment 700, a bundle 716 may include unshielded power feeder conductors 30, 32, 34, and grounded wires 130, 132, 134. The grounded wires 130, 132, 134 may not be positioned at the center of the bundle 716, but rather may be positioned at the outside of the bundle and evenly spaced between the unshielded power feeder conductors 30, 32, 34. In an embodiment, the grounded wires 130, 132, 134 may be spaced evenly about the bundle 716, as are the conductors 30, 32, 34. The embodiment 700 may be more compact than the embodiment of, for example, FIG. 11A, because the conductors are not spaced apart from each other to provide room for the grounded wires.

In each of the foregoing embodiments, the system is formed by providing at least one unshielded power feeder conductor, preferably power feeder conductors 30, 32, 34, providing at least one grounded wire 104, or multiple grounded wires 104a, 104b, 104c extending adjacent the power feeder conductors and being electrically isolated from them, and grounding the grounded wire 104. In embodiments, the method of constructing the system also may include steps of providing a spacer connected to the unshielded power feeder conductors 30, 32, 34, for example, and the grounded wire 104, 104a, 104b, 104c to maintain an orientation of the unshielded power feeder conductors and the grounded wire. Also in embodiments, a plurality of unshielded power feeder conductors may be provided and formed into a bundle with the grounded wire. Preferably, the system may be configured such that the grounded wire 104 may be located at a center of the bundle.

While the forms of apparatus and methods disclosed herein constitute preferred embodiments on the invention, it is to be understood that other forms may be employed without departing from the scope of the invention.

What is claimed is:

1. A system for lightning protection for power feeders, the system comprising:
   at least one unshielded power feeder conductor; and
   a grounded wire extending adjacent the at least one unshielded power feeder conductor and being electrically isolated therefrom, the grounded wire including a center grounded wire enclosed by at least one layer of a second grounded wire separated by a layer of insulation, thereby providing a relatively greater surface area or outer skin of the grounded wire for a given diameter and length of the grounded wire, whereby lightning current flowing through the grounded wire establishes a magnetic field sufficient to oppose and reduce lightning-induced current on the at least one power feeder conductor.

2. The system of claim 1, wherein the grounded wire includes a first end and a second end, the grounded wire being grounded at the first and second ends.

3. The system of claim 1, wherein the at least one unshielded power feeder conductor and the grounded wire together form a bundle, the grounded wire being positioned at a center of the bundle.

4. The system of claim 3, further comprising a plurality of unshielded power feeder conductors, the plurality of unshielded power feeder conductors and the grounded wire together forming the bundle, the grounded wire being positioned at a center of the bundle.

5. The system of claim 4, further comprising a plurality of grounded wires extending adjacent the plurality of unshielded power feeder conductors, the plurality of grounded wires and the plurality of unshielded power feeder conductors forming the bundle.

6. The system of claim 5, wherein the plurality of grounded wires being positioned at one of a center of the bundle and outside of the center of the bundle.

7. The system of claim 5, further comprising a spacer configured to engage and hold in place the plurality of grounded wires relative to the plurality of unshielded power feeder conductors.

8. The system of claim 1, wherein the grounded wire includes a center grounded wire enclosed by layers of grounded wires separated by layers of insulation.

9. The system of claim 1, further comprising a spacer configured to engage and hold in place the grounded wire relative to the at least one unshielded power feeder conductor.

10. The system of claim 1, further comprising a neutral wire extending adjacent the at least one unshielded power feeder conductor and the a grounded wire.

11. The system of claim 10, further comprising a spacer configured to engage and hold in place the at least one unshielded power feeder conductor, the grounded wire, and the neutral wire.

12. The system of claim 10, wherein the at least one unshielded power feeder conductor, the grounded wire and the neutral wire form a bundle, and the neutral wire is positioned at a center of the bundle.

13. The system of claim 12, further comprising a plurality of grounded wires, wherein the grounded wires are positioned adjacent the neutral wire.

14. The system of claim 13, wherein each of the plurality of grounded wires is spaced evenly around the neutral wire.

15. The system of claim 1, wherein the grounded wire is grounded to one or more of a power panel, a motor housing, a current return network, and a metal structure of an aircraft.

16. A system for lightning protection for power feeders for an aircraft, the system comprising:
    a plurality of unshielded power feeder conductors; and
    a grounded wire extending adjacent the plurality of unshielded power feeder conductors and being electrically isolated therefrom, the grounded wire including a center grounded wire enclosed by at least one layer of a second grounded wire separated by a layer of insulation, thereby providing a relatively greater surface area or outer skin of the rounded wire for a given diameter and length of the grounded wire;

the grounded wire and the plurality of unshielded power feeder conductors together forming a bundle, the grounded wire being positioned at a center of the bundle, whereby lightning current flowing through the grounded wire establishes a magnetic field sufficient to oppose and reduce lightning-induced current on the plurality of power feeder conductors; and the grounded wire grounded to a metal structure of the aircraft.

17. A method of forming a system for lightning protection for power feeders, the method comprising:

providing at least one unshielded power feeder conductor;

providing a ground wire extending adjacent the at least one unshielded power feeder conductor and being electrically isolated therefrom, the ground wire including a center ground wire enclosed by at least one layer of a second ground wire separated by a layer of insulation, thereby providing a relatively greater surface area or outer skin of the rounded wire for a given diameter and length of the grounded wire; and grounding the ground wire to form a grounded wire, whereby lightning current flowing through the grounded wire establishes a magnetic field sufficient to oppose and reduce lightning-induced current on the at least one power feeder conductor.

18. The method of claim 17, further comprising providing a spacer connected to the at least one unshielded power feeder conductor and the grounded wire to maintain an orientation of the at least one unshielded power feeder conductor and the grounded wire.

19. The method of claim 17, further comprising providing a plurality of unshielded power feeder conductors; and forming a bundle with the grounded wire.

20. The method of claim 19, further comprising locating the grounded wire at a center of the bundle.

* * * * *